(12) United States Patent
Murphy

(10) Patent No.: US 6,502,790 B1
(45) Date of Patent: Jan. 7, 2003

(54) INCLINED NON-UNIFORM PLANAR SPACED CONSTELLATION OF SATELLITES

(75) Inventor: John H. Murphy, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/988,781

(22) Filed: Nov. 20, 2001

(51) Int. Cl.$^7$ ................................................ B64G 1/10

(52) U.S. Cl. .................................. 244/158 R; 244/172
(58) Field of Search ............................ 244/158 R, 172; 370/316

(56) References Cited

U.S. PATENT DOCUMENTS

| | | | |
|---|---|---|---|
| 5,641,134 A | | 6/1997 | Vatt |
| 5,668,556 A | | 9/1997 | Rouffet et al. |
| 5,788,187 A | * | 8/1998 | Castiel et al. ............ 244/158 R |
| 6,249,513 B1 | * | 6/2001 | Malarky ...................... 370/316 |
| 2002/0082776 A1 | * | 11/2001 | Castiel ........................ 701/226 |

OTHER PUBLICATIONS

Article "2.8 Satellite–Based Radar Systems", Space–Based Radar Handbook, Leopold J. Cantafio, pp.71–83.
"1.6 Hybrid Configurations for Satellite Constellations", Giovanni B. Palmerini, pp. 81–89.
Mission Design & Implementation of Satellite Constellations, Proceedings of an International Workshop, Toulouse, France, Nov., 1997, edited by Jozef C. van der Ha: Article 1.4 A Comparison of Satellite Constellations for Continuous Global Coverage, Thomas J. Lang et al., pp. 51–61; and Article 6.1 Orion—A Constellation Mission Analysis Tool, Genevieve Dutruel–Lecohier, pp. 373–393.

"Minimum Number of Satellites for Three–Dimensional Continuous Worldwide Coverage" Hosam E. Emara et al., IEEE Transactions on Aerospace and Electronic Systems, vol. AES–13, No. 2., Mar., 1977, pp. 108–111.
"Satellite Patterns for Continuous Multiple Whole–Earth Coverage", J.G. Walker, Space Department, Royal Aircraft Establishment, Farnborough, UK, pp. 119–122.
"Some Circular Orbit Patterns Providing Continuous Whole Earth Coverage", Journal of the British Interplanetary Society, J.G. Walker, vol. 24, pp. 369–384, 1971, pp. 369–384.
Three– and Four–Satellite Continuous–Coverage Constellations, J. Guidance, John E. Draim, vol. 8, No. 6, Nov.–Dec., 1985, pp. 725–730.
Coverage Predictions and Selection Criteria for Satellite Constellations, Royal Aircraft Establishment, J.G. Walker, Technical Report 82116.
Common–Period Four–Satellite Continuous Global Coverage Constellation, J. Guidance, John E. Draim, vol. 10, No. 5, pp. 492–499.

* cited by examiner

*Primary Examiner*—Michael J. Carone
*Assistant Examiner*—Gabriel S. Sukman
(74) *Attorney, Agent, or Firm*—Birch, Stewart, Kolasch & Birch, LLP

(57) ABSTRACT

A non-uniform planar spaced constellation of satellites for providing continuous global or regional coverage including at least one pair of orbital planes having inclined co-rotating orbits, and at least one other orbital plane immediately adjacent one orbital plane of the pair of orbital planes having an inclined counter-rotating orbit, and wherein the fields of view of the satellites in the one pair of co-rotating orbital planes form an overlapped array of hexagonal packing at the equator, and the field of view of the satellites in the one other counter-rotating orbital plane and the one co-rotating orbital plane of the pair of co-rotating orbits form an overlapped array of rectangular packing at the equator, and wherein the spacing between the pair of co-rotating orbital planes is greater than the spacing between the one other counter-rotating orbital plane and the one co-rotating orbital plane.

23 Claims, 9 Drawing Sheets

HEXAGONAL PACKING
ACCESS DEFINITION

INCLINED NON-UNIFORM PLANAR SPACED CONSTELLATION OF SATELLITES

BACKGROUND OF THE INVENTION

1. Field of the Invention

This invention relates generally to satellite constellations and more particularly to constellations providing continuous global or regional coverage.

2. Description of Related Art

As a new era in space based intelligence gathering is being entered, threats to national security are no longer geographically constrained and intelligence gathering on a ubiquitous, global scale has become a necessity. As a result, a variety of space-based radar applications are being developed.

Constellations of satellites having earth coverage capabilities are well known and have been well documented. Generally, such systems fall into two broad categories, namely, constellations having polar orbits and those having non-polar or inclined orbits. Most current and planned satellite constellations in space having a requirement to provide continuous global coverage are based on uniform planar spacing using Walker orbital designations, wherein Walker constellations consisting of a plurality of equally spaced circular orbits having particular orbital inclinations are fully identified by: (1) a three integer code reference T/P/F, where T is the total number of satellites in the pattern, P is the number of planes between which the number of satellites are equally divided, and F is a measure of the relative phasing of satellites in adjacent planes; and (2) the inclination angle, i, of all the orbital planes relative to a reference plane which is typically the equator of the earth.

A review of constellation design, including Walker constellations, has been set forth in a publication entitled "Mission Design & Implementation Of Satellite Constellations", published by Kluwer Academic Publishers in the Proceedings of an International Workshop, held in Toulouse, France, 1997, and edited by Jozef C. van der Ha, pp. 373–393.

SUMMARY

It is an object of the present invention, therefore, to provide a reduction in the number of satellites required to provide continuous global or regional coverage.

It is a further object of the invention to provide a constellation of satellites including a plurality of inclined orbits.

It is yet another object of the invention to provide continuous global or regional coverage by satellites including a plurality of inclined orbits having non-uniform or asymmetrical spacing and fewer in number than Walker constellations.

These and other objects are achieved by a non-uniform planar spaced constellation of satellites for providing continuous world-wide or regional coverage for applications including, but not limited to, space based radar and, comprising: at least one pair of orbital planes including a plurality of satellites having inclined co-rotating orbits; at least one other orbital plane immediately adjacent one orbital plane of said at least one pair of orbital planes and including a plurality of satellites having an inclined counter-rotating orbit; and wherein the fields of view of the satellites in said at least one pair of co-rotating orbital planes form an overlapped array of hexagonal packing at the equator and the field of view of the satellites in said one co-rotating orbital plane and said one other counter-rotating orbital plane form an overlapped array of rectangular packing at the equator, and wherein the spacing between said at least one pair of co-rotating orbital planes is greater than the spacing between said at least one other counter-rotating orbital plane and said one co-rotating orbital plane.

Further scope of applicability of the present invention will become apparent from the detailed description provided hereinafter. It should be understood, however, that the detailed description and specific embodiment, while disclosing the preferred embodiment of the invention, it should be noted that it is being provided by way of illustration only, since various changes and modifications coming within the spirit and scope of the invention will become apparent to those skilled in the art from the following detailed description.

BRIEF DESCRIPTION OF THE DRAWINGS

The present invention will become more fully understood when the accompanying drawings are considered together with the detailed description provided hereinafter and which are provided by way of illustration only, and thus are not meant to be limitative of the invention, and wherein.

DETAILED DESCRIPTION OF THE INVENTION

Figure 1:
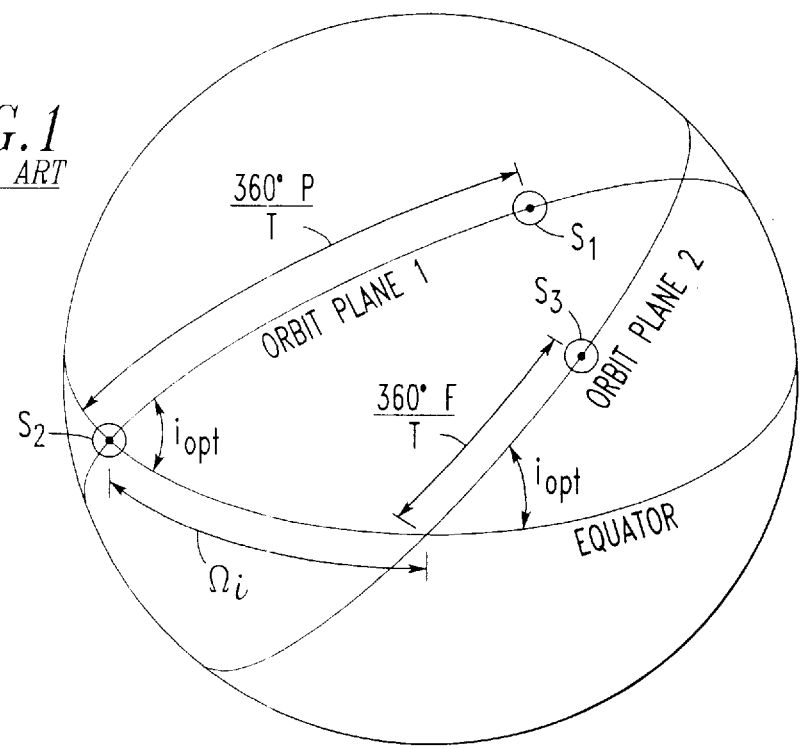
FIG. 1 is illustrative of a Walker constellation having inclined or non-polar orbital planes.

Referring now to the figures wherein like reference characters refer to like components throughout, reference is first made to FIG. 1 where there is shown a diagram of a well known inclined Walker constellation consisting of a plurality of inclined, i.e., non-polar satellite orbital planes, such as planes 1 and 2, which cross the equator at an angle $i_{opt}$, the optimized inclination angle that is common to all planes in the constellation.

In a Walker constellation, all of the orbital planes have equal planar spacing $\Omega_i$ where $\Omega_i=360°/P$, where P is equal to the number of orbital planes. All of the satellites, for example $s_1$ and $s_2$, are equally spaced along the respective orbital plane, e.g. orbital plane 1, by $360°\times P/T$, where T is the number of satellites. Phasing difference between satellites in adjacent planes 1 and 2, for example S3 and S2, referenced against the equator is $360°\times F/T$, where F is the phasing parameter which consists of an integer.

Figure 2:
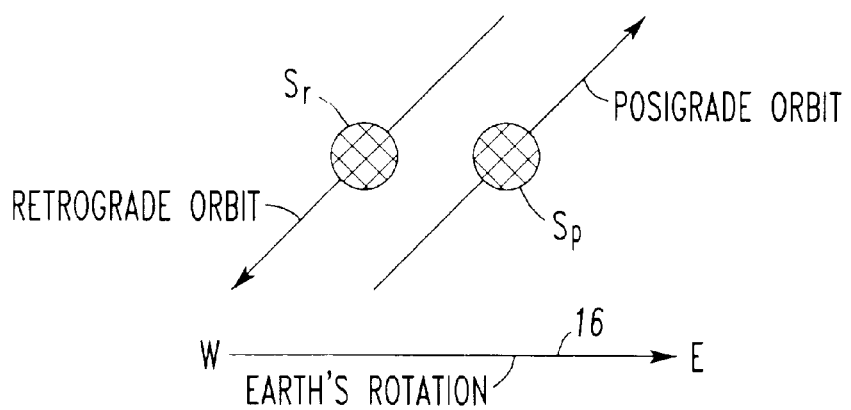
FIG. 2 is a diagram illustrative of posigrade and retrograde satellite orbits.
Figure 3:
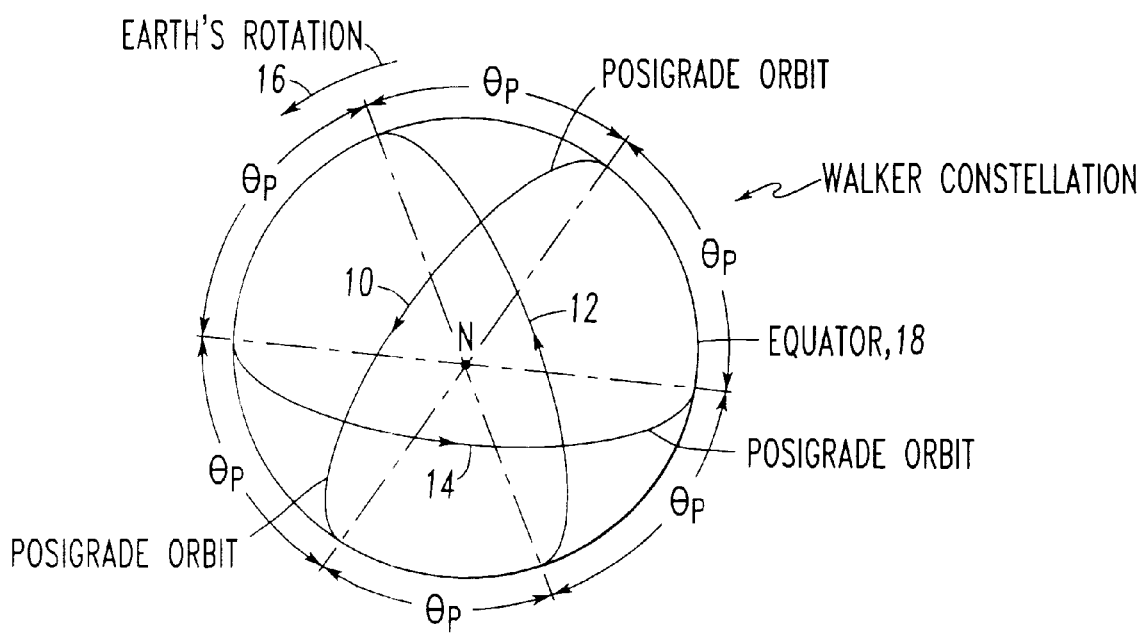
FIG. 3 is a diagram illustrative of a three inclined plane Walker constellation in accordance with the known prior art.
Figure 4:
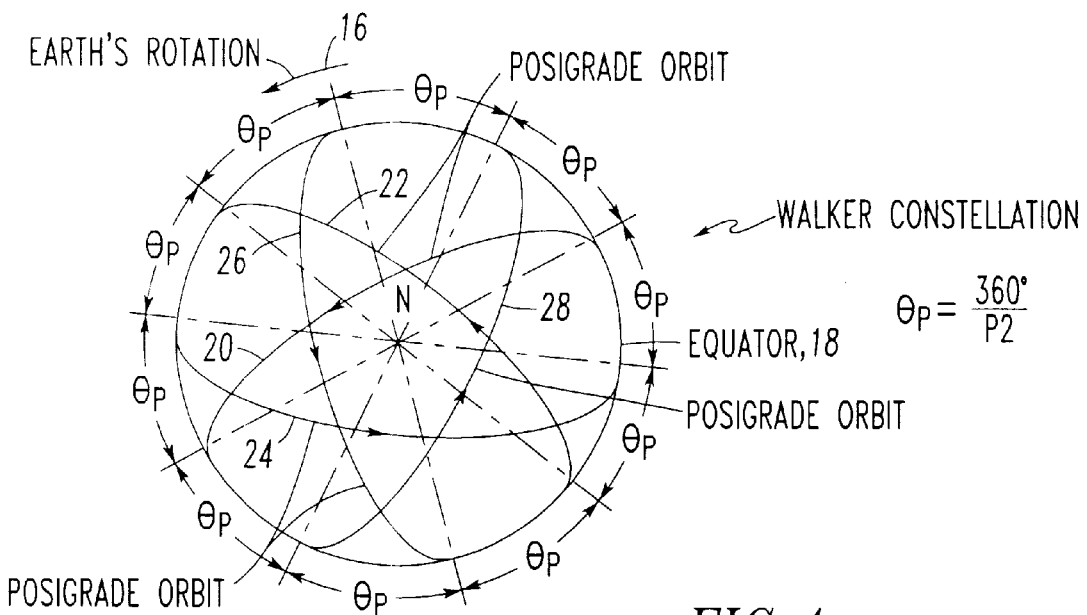
FIG. 4 is a diagram of a well known five inclined plane Walker constellation.

With respect to FIGS. 2–4, FIG. 2 is illustrative of what are termed "retrograde" and "posigrade" orbital planes, or simply orbits, and indicate the sense of direction of the satellite(s) in that orbital plane relative to the direction of the earth's rotation, which in FIG. 2 is shown by the arrow pointing from left to right and indicative of west (W) to east (E). Thus satellites $s_p$ in a posigrade orbit move in the same directional sense as the earth's rotation. As shown, a retrograde orbit includes one or more satellites $s_r$ moving in an opposite sense to the earth's rotation.

This now leads to a consideration of the two constellations as shown in FIGS. 3 and 4, and comprising Walker constellations having three inclined orbital planes and five inclined orbital planes, respectively. FIG. 3 depicts a top plan view of three inclined orbits 10, 12 and 14, relative to the north (N) pole while looking down from space above the north pole. The earth's rotation is shown by reference numeral 16, with the earth's equator being shown by reference numeral 18. In accordance with a Walker constellation, all three orbits 10, 12 and 14 of FIG. 3 are illustrative of posigrade orbits having equal planar spacing $\Omega_i=\theta_p=60°$. Likewise, the five orbit Walker constellation as shown in FIG. 4 includes five inclined orbits, 20, 22, 24, 26 and 28 also comprised of posigrade orbits arid having mutually equal planar spacings of $\theta_p=36°$.

Figure 5:
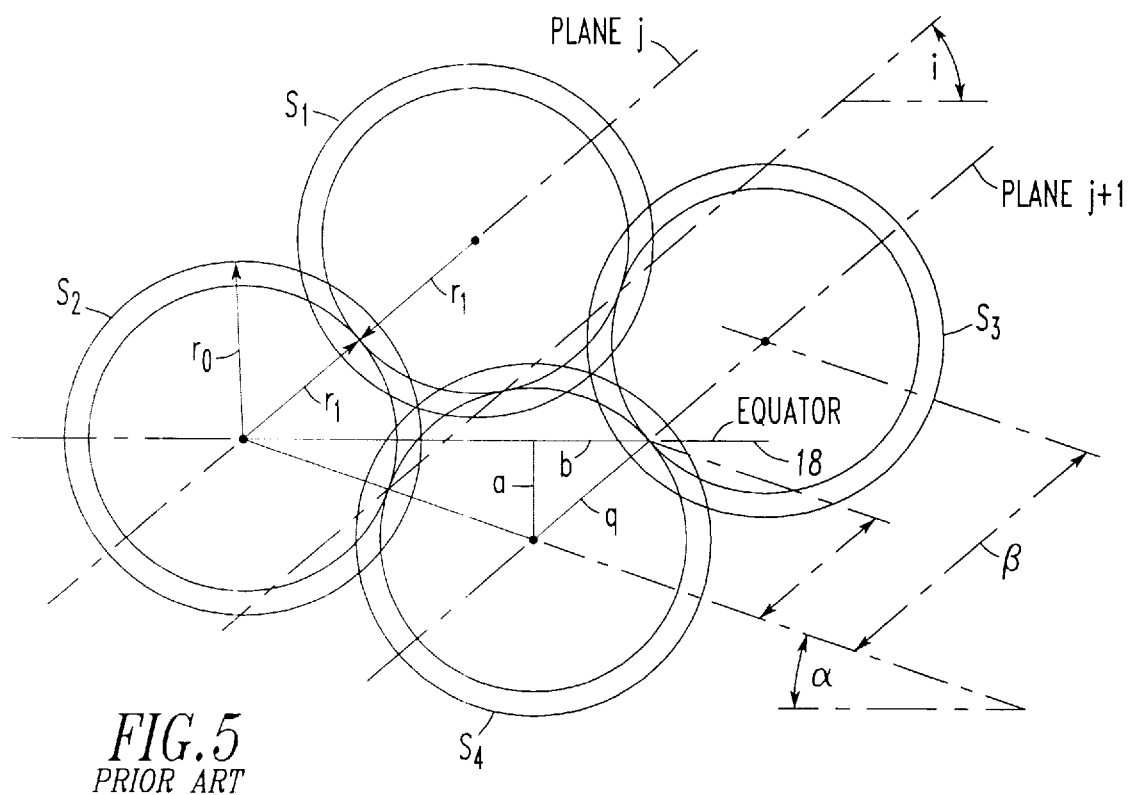
FIG. 5 is a diagram illustrative of the angular relationship of satellites in a Walker constellation traveling in two adjacent orbital planes.

Conventional Walker constellation designs such as shown in FIGS. 3 and 4, are based on planar spacings consistent with rectangular arrays of fields of view at the equator, commonly referred to as "packing". Such an arrangement is shown in FIG. 5 where two satellites $s_1$ and $s_2$ are traveling in an inclined plane j in substantially parallel relationship with a pair of satellites $s_3$ and $s_4$ in an adjacent plane j+1. Both planes j and j+1 have the same inclination angle i. The reference character $r_1$ designates the radius of fields of view of adjacent satellites which touch each other, while the radius $r_0$ is indicative of the required field of view so that no open space exists between the field of view of satellites $s_1$, $s_2$, $s_3$, and $s_4$.

The diagram of FIG. 5 can be used to determine the relationship between the inclination angle i and the phasing parameter F in the following manner by letting the distance $a=2r_0 \sin\alpha$ where $\alpha=i-\pi/3$ and $b=a/\tan i$. Then $q=(a^2+b^2)^{0.5}$. The quantity q can also be stated as $q=2\, r_0 \sin a \cos i$. From this, the phasing parameter F can be determined by the following expression:

$$F=-Pq/2r_0 \quad (1)$$

$$F=-P\cos i \sin (i-\pi/3), \text{ where } i<\pi/3 \quad (2)$$

$$F=P-P\cos i \sin (i-\pi/3), \text{ where } i>\pi/3 \quad (3)$$

Analysis of the Walker constellations shown in FIGS. 3 and 4 indicates two weaknesses which can be exploited to achieve fewer numbers of satellites in the constellations. First, the phasing parameter F is an integer. This choice of integer phasing parameters F simplifies the notation of Walker orbits to the three-integer combination T/P/F. However, there is no physical reason for constraining the orbits to having integer phasing parameters F. Secondly, the Walker orbits assume equally planar spacing $\theta_p$. Again, this is done to simplify the orbit designation. However, there is no physical reason for constraining the orbits to equally planar spacing.

The phasing parameter F is a critical parameter in determining the amount of overlap between adjacent planes. The worst case occurs when F=0 and the fields of view from the satellites form a rectangular array, referred to as "rectangular packing". The best case occurs when the fields of view from the satellites form an overlapping hexagonal array, i.e., "hexagonal packing". For example, in polar orbits the phasing parameter F must be set to F=n/2, where n=T/P equals the number of satellites per plane. Accordingly, if the integer requirement for the parameter phasing F is removed, an optimum placement of satellites with respect to the number of planes can be achieved resulting in a reduction in the number of satellites required for providing continuous global coverage.

Equal planar spacing provided for in Walker constellations forces a non-optimal solution for continuous global coverage. A close examination of the overlap between planes indicate that improvement in satellite count can be achieved with non-uniform planar spaces where, for example, two adjacent planes with satellites circulating in the same sense, the best overlap occurs when the field of view forms and overlapped hexagonal array or packing at the equator. However, for two planes with satellites circulating in the mutually opposite sense, the best overlap at the equator is no better than when the fields of view line up and form an overlapped rectangular array. Since the best overlaps are for hexagonal arrays, i.e., hexagonal close packing at the equator, the planes should be grouped to maximize the number of interfaces with satellites circulating in the same sense. Accordingly, the subject invention is directed to such an approach where a non-uniform planar spacing is provided.

This now leads to a consideration of the subject invention which is directed to non-uniformly spaced constellation designs which are based on having adjacent planes with the satellites orbiting in the same direction sense so that the fields of view of the satellites at the equator form an overlapped hexagonal array while adjacent planes with satellites orbiting in mutually opposite sense directions form an overlapped rectangular array at the equator and where the spacing between planes having satellites orbiting in the same sense is greater than the planar spacing between planes with satellites orbiting in the opposite sense.

Figure 6:
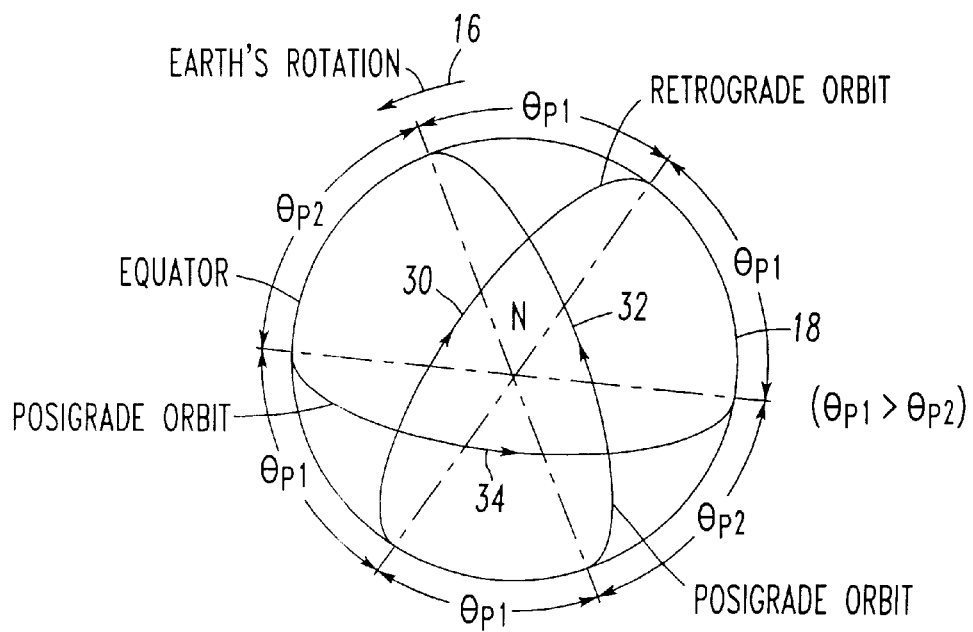
FIG. 6 is a diagram illustrative of a three inclined orbital plane constellation in accordance with the subject invention.

FIG. 6, for example, is illustrative of a first embodiment of the subject invention wherein three inclined satellite orbital planes 30, 32 and 34 are implemented, with planes 32 and 34 being comprised of posigrade orbits, while plane 30 comprises a retrograde orbit. Two angular spacings $\theta_{p1}$ and $\theta_{p2}$ are also shown and are referred to hereinafter as the planar spacing angle and the interface angle, respectively. The planar spacing angle $\theta_{p1}$ is defined as the angle between orbital planes having North/South vectors in the same direction relative to the equator, while the interface angle $\theta_{p2}$ is defined as the angle between orbital planes having North/South vectors in mutually opposite directions when crossing the equator.

Figure 7:
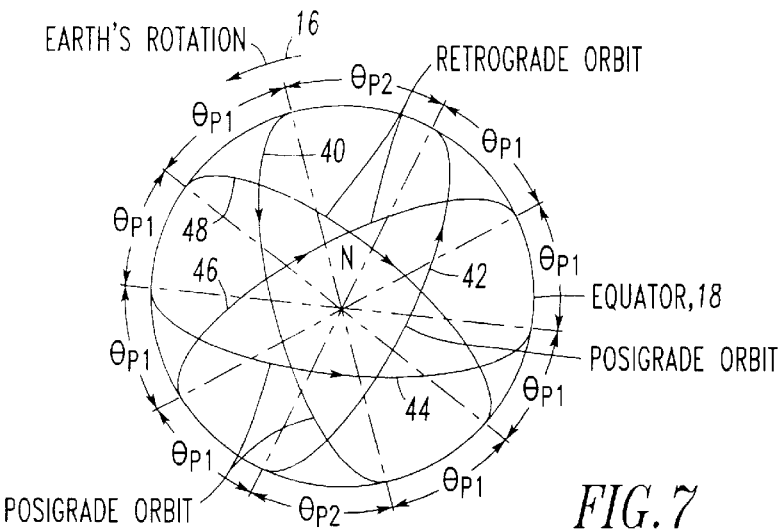
FIG. 7 is a diagram illustrative of a five inclined orbital plane constellation in accordance with the subject invention.

Similarly with respect to the five inclined orbital plane implementations shown in FIG. 7, three of the inclined planes 40, 42 and 44 comprise posigrade orbital planes, while the other two planes 46 and 48 comprise retrograde orbital planes which are located between a pair of posigrade orbits such that retrograde orbit 46, for example, is located between posigrade orbits 42 and 44, while the retrograde orbit 48 is located between posigrade orbits 40 and 44, with appropriate spacing angle $\theta_{p1}$ and $\theta p_{p2}$, defined above, also being shown.

Figure 8A:
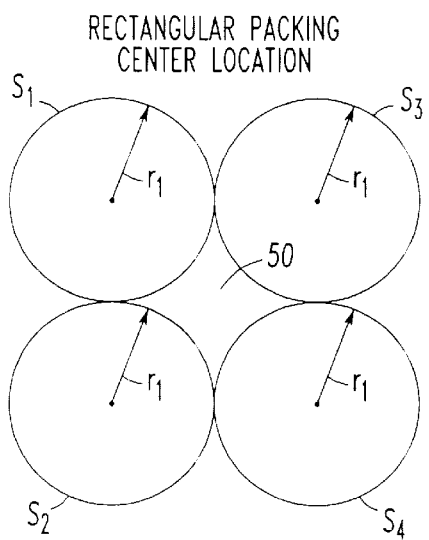
FIGS. 8A and 8B are illustrative of rectangular packing of adjacent satellite fields of view.
Figure 8B:
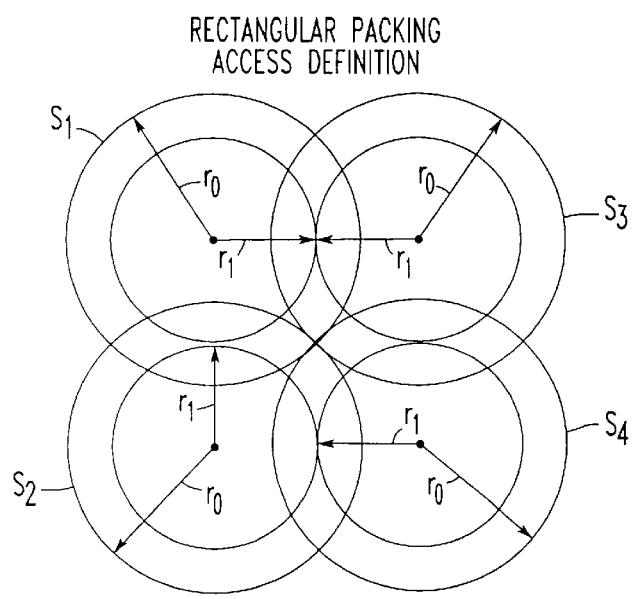
Figure 9A:
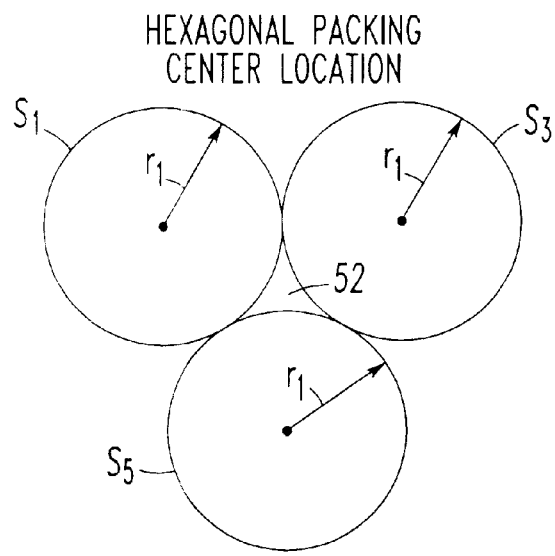
FIGS. 9A and 9B are illustrative of hexagonal packing of adjacent satellite fields of view.

With respect to FIGS. 8A, 8B and 9A, 9B, shown thereat are examples of satellite fields of view for both rectangular packing and hexagonal packing. As shown in FIG. 8A, four satellites $s_1$, $s_2$, $s_3$ and $s_4$ line up in a rectangular array vs. three satellites $s_1$, $s_3$ and $s_5$ as shown in FIG. 9A, which line up in a hexagonal array. It can be seen that the open space shown by reference numeral 50 between the satellites in a rectangular packing configuration of FIG. 8A is greater than the space 52 between the satellites shown in FIG. 9A in a hexagonal packing configuration. Accordingly, in order to illuminate the spacing 50, the radius $r_1$ of the field of view must be increased to $r_0$ as shown in FIG. 8B, to form an overlapped rectangular array. With respect to the hexagonal packing configuration shown in FIG. 9, the space 52 can be eliminated by increasing the radius $r_1$ to a slightly larger radius $r_0$ which is less than that shown in FIG. 8B for rectangular packing.

Figure 9B:
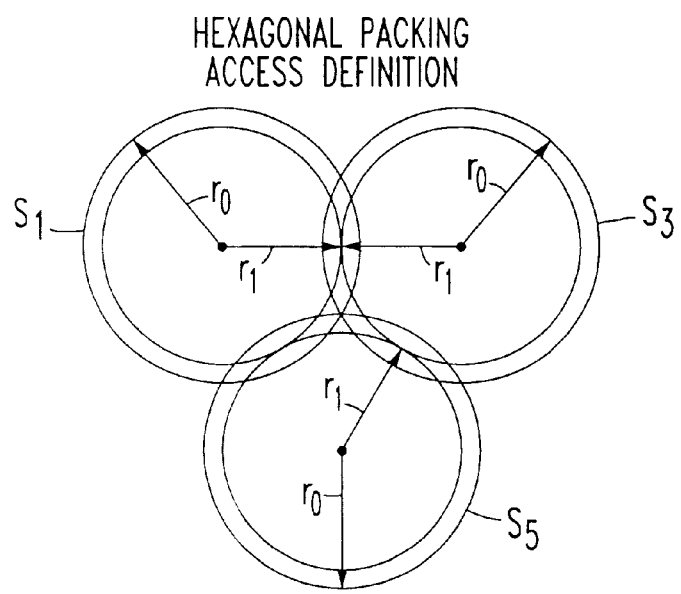
Figure 10A:
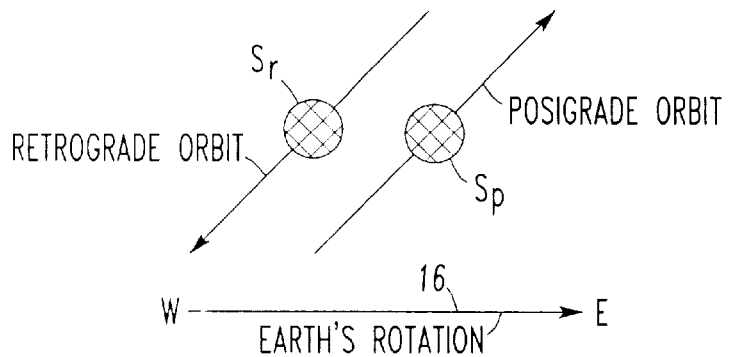
FIGS. 10A–10D are illustrative of four conditions of mutually parallel adjacent posigrade and retrograde orbits requiring rectangular packing in accordance with the subject invention.
Figure 10B:
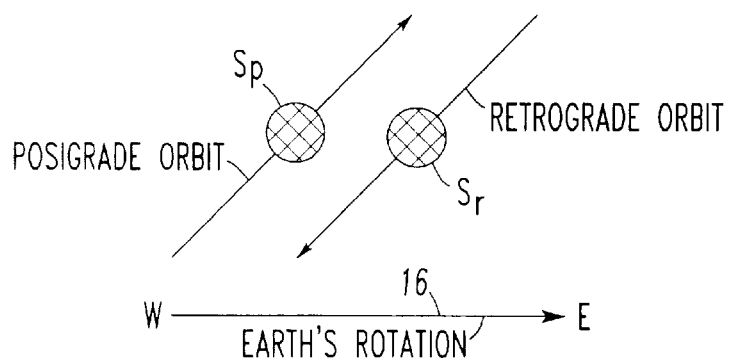
Figure 10C:
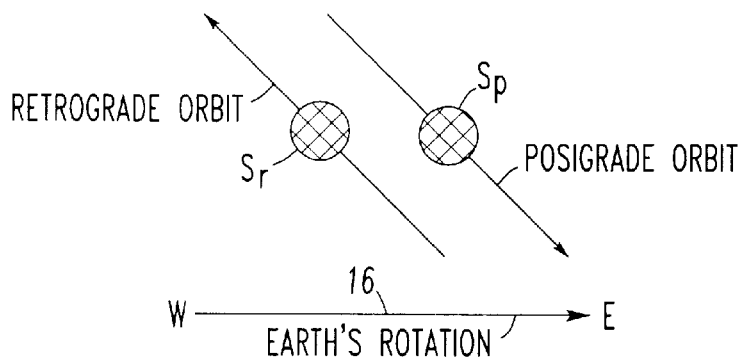
Figure 10D:
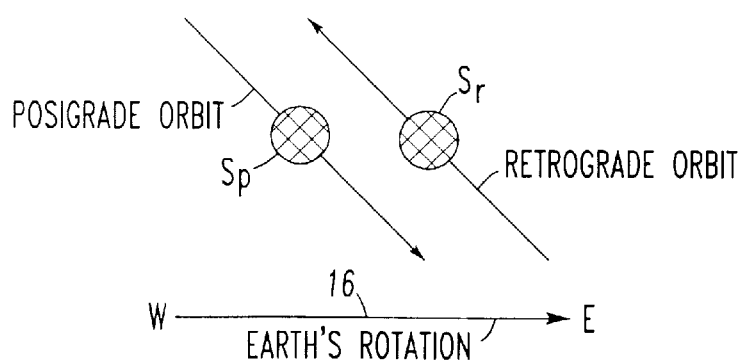
Figure 11A:
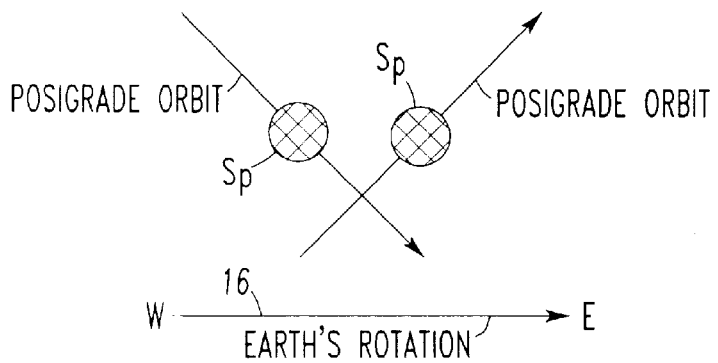
FIGS. 11A–11D are illustrative of four conditions of mutually adjacent crossed posigrade and retrograde orbits requiring rectangular packing in accordance with the subject invention.
Figure 11B:
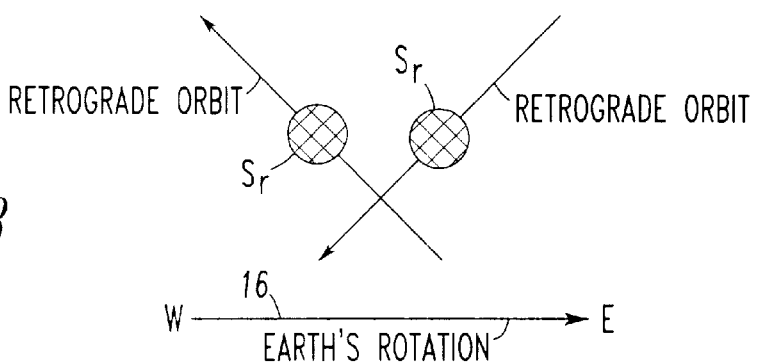
Figure 11C:
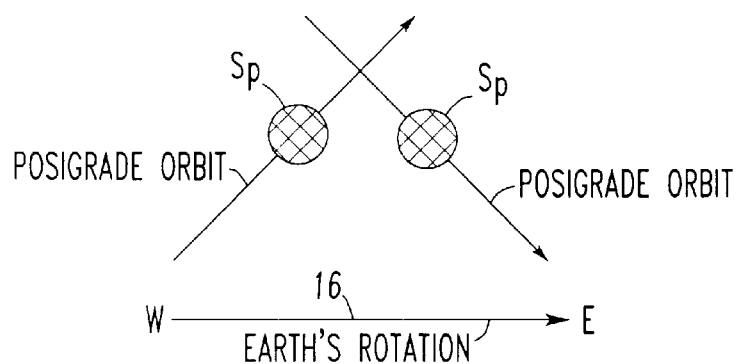
Figure 11D:
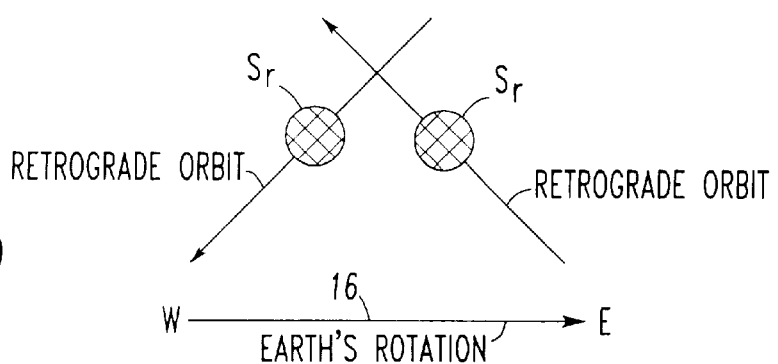
Figure 12A:
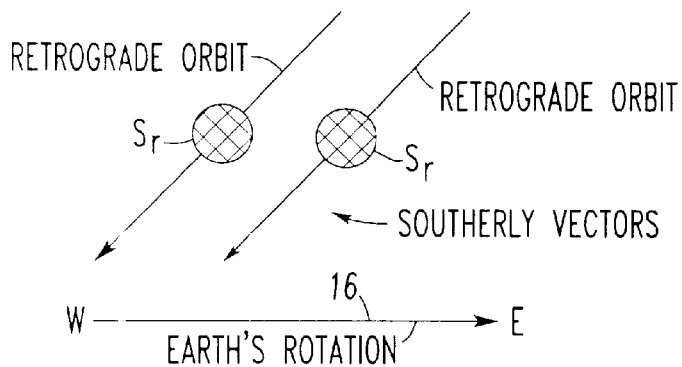
FIGS. 12A–12D are illustrative of four examples of mutually adjacent parallel posigrade and retrograde orbits requiring hexagonal packing in accordance with the subject invention.
Figure 12B:
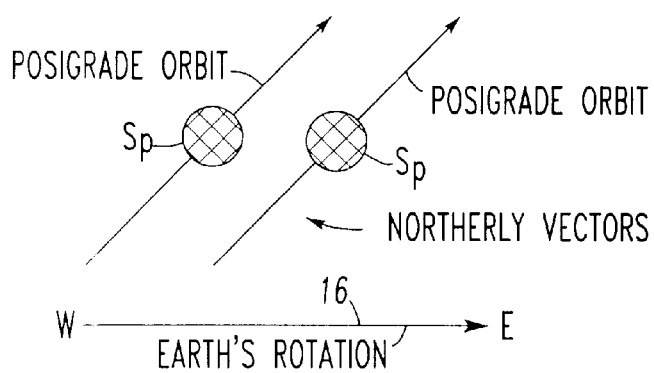
Figure 12C:
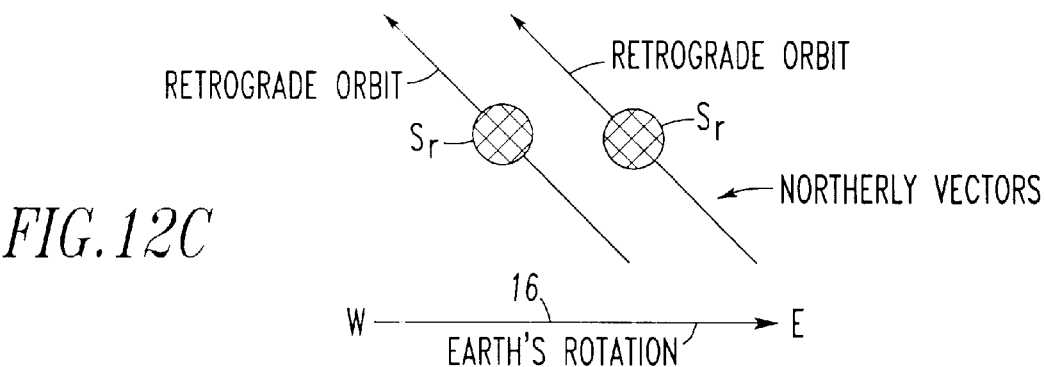
Figure 12D:
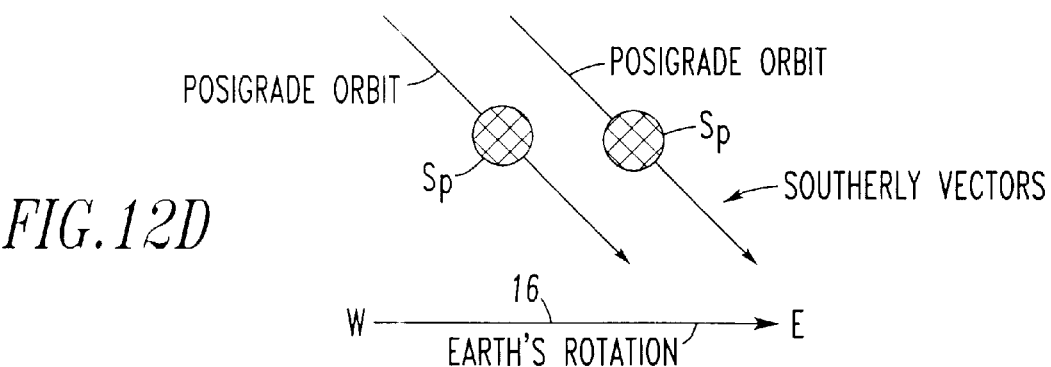
Figure 13A:
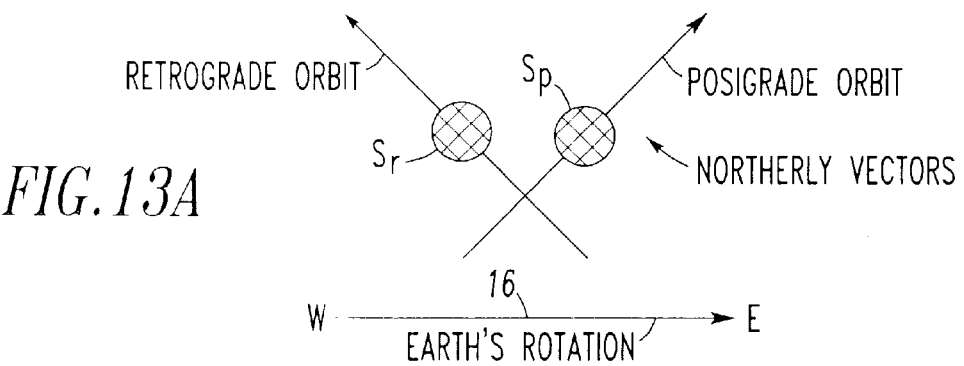
FIGS. 13A–13D are illustrative of four conditions of mutually adjacent crossed posigrade and retrograde orbits requiring hexagonal packing in accordance with the subject invention.
Figure 13B:
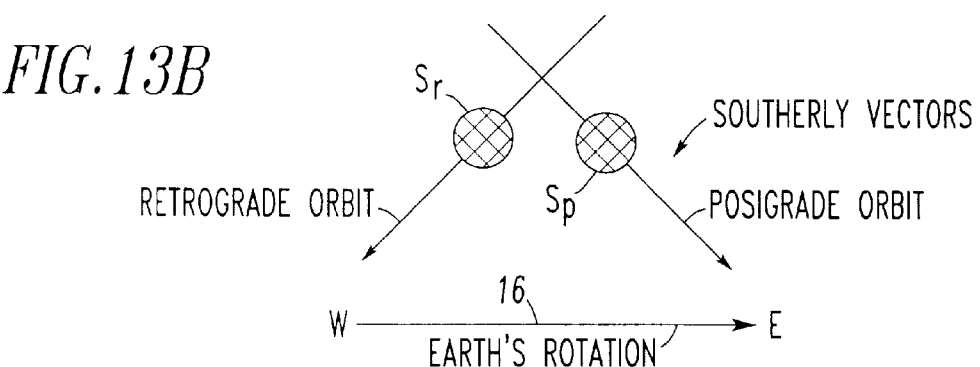
Figure 13C:
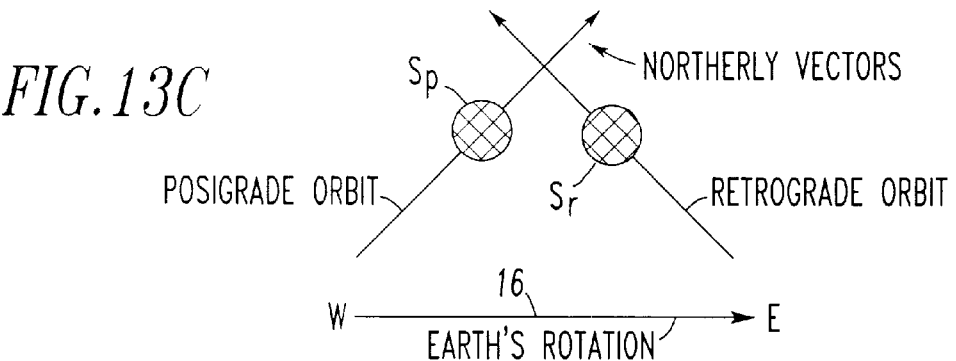
Figure 13D:
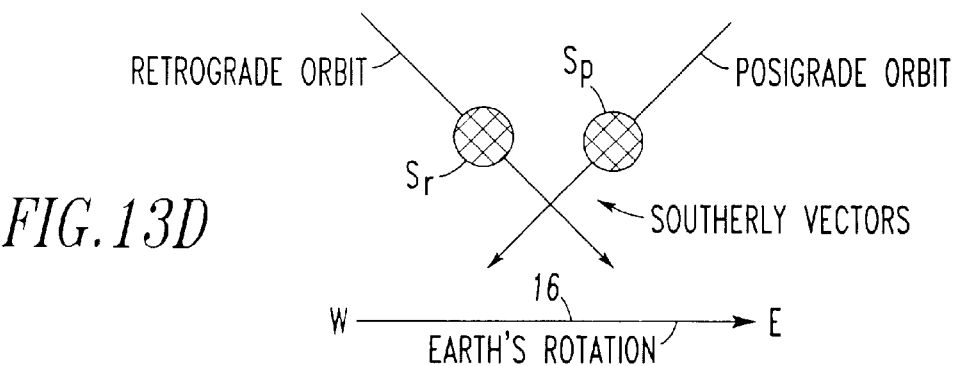

Thus for two adjacent planes with satellites circulating in the same sense, the best overlap occurs when the field of views form an overlap hexagonal array at the equator as shown in FIG. 9B. However, for two planes of satellites circulating in the opposite sense, the best overlap at the equator never gets better than that in the fields of view line up for an overlap rectangular array as shown in FIG. 8B. Since the best overlaps are for the hexagonal arrays, the planes should be grouped to maximize the number of satellite planes having satellites circulating in the same directional sense.

In accordance with the subject invention, there are 16 possible inclined orbital planes, which determine whether or not rectangular packing or hexagonal packing is required. These are shown in FIGS. 10A–10D, FIGS. 11A–11D, FIGS. 12A–12D, and FIGS. 13A–13D.

FIGS. 10A–10D are illustrative of adjacent parallel retrograde and posigrade orbits, with the posigrade orbits in the same directional sense as the earth's rotation, while the retrograde orbits are in an opposite directional sense relative to the earth's rotation and thus require rectangular packing at the equator. With respect to the orbital configurations of FIGS. 11A–11D, shown thereat are four combinations of crossed orbits of adjacent planes at the equator where the orbiting sense is mutually opposite to one another. In both sets of conditions where the respective pairs of orbits are in mutual opposition, rectangular packing is required.

With respect to FIGS. 12A–12D, shown thereat are four combinations of posigrade and retrograde orbits where mutually adjacent parallel planes comprise same sense orbiting directions and comprise pairs of retrograde or posigrade orbits oriented in the same North/South vector direction. As to FIGS. 13A–13D, shown thereat are four combinations of posigrade and retrograde orbits of adjacent orbital planes which cross one another at the equator but have the same northernly or southernly vectors with respect to the earth's rotation. In this instance, hexagonal packing is required Thus it can be seen that adjacent orbital planes having mutually opposite directional senses of orbiting satellites at the equator require rectangular packing while mutually adjacent orbiting planes having satellites moving in the same direction sense at the equator require hexagonal packing at the equator.

A non-uniform planar space constellation in accordance with the subject invention can be completely defined by the following definitions and algorithms: Where, h=satellite altitude; $\alpha=\beta_1$=minimum grazing angle; $R_e$=earth's radius; n=number of satellites per plane $\geq n_{min}$; and P=number of planes $\geq P_{min}$;

the access radius $r_0$ is expressed as, $$r_0 = R_e\{\pi/2 - \alpha - a\sin[(R_e \cos \alpha)/(R_e + h)]\}, \quad (4)$$

the minimum number of satellites $n_{min}$ per plane for ubiquitous 1-satellite access is, $$n_{min} = \text{ceiling}(\pi R_e/r_0, 1), \quad (5)$$

using a flat earth model, the width w of ubiquitous access ring is, $$w = 2[r_0^2 - (\pi R_e/n)^2]^{1/2}, \quad (6)$$

using a spherical earth model, $$w = 2R_e \, a\cos\,[\cos(r_0/R_e)/\cos(\pi/n)], \quad (7)$$

the inclination angle i is determined by the latitudes of coverage desired, for ubiquitous coverage to the poles, $$i = a\sin\,[\cos(r/R_e)/\cos(\pi/n)], \quad (8)$$

the minimum number of planes $P_{min}$ for ubiquitous 1-satellite access is, $$P_{min} = \text{ceiling}(\pi R_e \sin i/w, 1), \quad (9)$$

the total number T of satellites is, $$T = nP, \quad (10)$$

the phasing parameter F for hexagonal packing is, $$F = \text{mod}[-P \cos i \sin (i-\pi/3), P], \quad (11)$$

the unscaled planar spacing $\theta_1$ is, $$(r_0 + w/2)/(R_e \sin i), \quad (12)$$

the unscaled planar interface angle $\theta_2$ is, $$w/(R_e \sin i), \quad (13)$$

the unscaled total angle $\theta_3$ is, $$\theta_3 = (P-1)\theta_1 + \theta_2, \quad (14)$$

the planar spacing $\theta_{p1}$ is, $$\theta_{p1} = \theta_1 \times \pi/\theta_3, \text{ and}, \quad (15)$$

the interface angle $\theta_{p2}$ is, $$\theta_{p2} = \theta_2 \times \pi/\theta_3, \quad (16)$$

A simpler and more accurate closed form set of formulas for planar spacing $\theta_{p1}$ and interface angle $\theta_{p2}$ can be stated as follows.

For an embodiment of the invention having only one counter-rotating orbital plane, the planar spacing $\theta_{p1}$ can be expressed as:

$$\theta_{p1} = \pi/(P-1+2/3\,\sqrt{2})\text{ radians}, \quad (17)$$

or $$\theta_{p1} = 180/(P-1+2/3\,\sqrt{2})\text{ degrees}, \quad (18)$$

The interface angle $\theta_{p2}$ can be stated as:

$$\theta_{p2}=2/3\ \sqrt{2}\pi/(P1+2/3\ \sqrt{2})\ \text{radians}, \quad (19)$$

or $$\theta_{p2}=2/3\ \sqrt{2}180/(P-1+2/3\ \sqrt{2})\ \text{degrees}. \quad (20)$$

For an embodiment having m counter-rotating orbital planes, the planar spacing $\theta_{p1}$ can be stated as:

$$\theta_{p1}=\pi/(P-m+2m/3\ \sqrt{2})\ \text{radians}, \quad (21)$$

or $$\theta_{p1}=180/(P-m+2m/3\ \sqrt{2})\ \text{degrees}, \quad (22)$$

and the interface angle $\theta_{p2}$ can be stated as:

$$\theta_{p2}=2m/3\ \sqrt{2}\pi/(P-m+2m/3\ \sqrt{2})\ \text{radians}, \quad (23)$$

or $$\theta_{p2}=2m/3\ \sqrt{2}180/(P-m+2m/3\ \sqrt{2})\ \text{degrees}. \quad (24)$$

A satellite constellation design in accordance with the foregoing definitions and algorithms results in $\theta_{p1}<\theta_{p2}$ so that in effect the phasing parameter F in Walker orbital designations becomes a non-integer and typically provides a 15% saving in the number of satellites needed to provide continuous global coverage due to the fact that the present invention adjusts the planar spacing to minimize overlap in the fields of view or packing.

The foregoing detailed description merely illustrates the principles of the invention. It will thus be appreciated that those skilled in the art will be able to devise various arrangements which although not explicitly described and shown herein, nevertheless embody the principles of the invention and are thus within its spirit and scope.

What is claimed is:

1. A non-uniform planar spaced constellation of satellites for providing continuous global or regional coverage of the earth, comprising:
   at least one pair of orbital planes including a plurality of satellites having inclined co-rotating orbits;
   at least one other orbital plane immediately adjacent one orbital plane of said at least one pair of orbital planes and including a plurality of satellites having an inclined counter-rotating orbit; and,
   wherein the fields of view of the satellites in said at least one pair of orbital planes form an overlapped array of hexagonal packing at the earth's equator and the fields of view of the satellites in said one orbital plane and said one other orbital plane form an overlapped array of rectangular packing at the equator.

2. A constellation of satellites according to claim 1, wherein the spacing between said at least one pair of co-rotating orbital planes is of a first angular spacing and the spacing between said one co-rotating orbital plane and said at least one other counter-rotating orbital plane is of a second angular spacing.

3. A constellation of satellites according to claim 2 wherein said first angular spacing is greater than said second angular spacing.

4. A non-uniform planar spaced constellation of satellites for providing continuous global or regional coverage of the earth, comprising:
   a plurality of inclined satellite orbital planes, each including- at least one satellite and having the same northernly or southernly vectors relative to the rotation of the earth;
   at least one inclined orbital plane including at least one satellite located, between a pair of said plurality of orbital planes and having an opposite northernly or southernly vector relative to the vectors of said satellites in said plurality of orbital planes; and,
   wherein the fields of view of the satellites in mutually adjacent planes of said plurality of orbital planes form an overlapped array of hexagonal packing at the earth's equator and the fields of view of the satellites in said at least one orbital plane and one mutually adjacent orbital plane of said pair of orbital planes form an overlapped array of rectangular packing the equator.

5. A constellation of satellites according to claim 3, wherein the mutual spacing between said plurality of orbital planes having the same vectors is of a first angular spacing and the spacing between said at least one orbital plane and said one orbital plane of said pair of orbital planes is of a second angular spacing.

6. A constellation of satellites according to claim 5 wherein said first angular spacing is greater than said second angular spacing.

7. A constellation of satellites according to claim 6, and additionally including at least one other inclined orbital plane including at least one satellite having said same opposite vector located between another pair of orbital planes of said plurality of orbital planes, and wherein the spacing of said one other inclined orbit and one orbital plane of said another pair of orbits is substantially equal to said second angular spacing.

8. A constellation of satellites according to claim 5 wherein said plurality of orbital planes having said same northernly or southernly vectors comprises mutually adjacent non-crossing orbital planes at the equator.

9. A constellation of satellites according to claim 5 wherein said plurality of orbital planes having said same northernly or southernly vectors comprise mutually adjacent crossing orbital planes at the equator.

10. A constellation of satellites according to claim 5 wherein said at least one orbital plane and said one orbital plane of said pair of orbital planes having mutually opposite vectors comprises mutually adjacent non-crossing orbital planes at the equator.

11. A constellation of satellites according to claim 5 wherein said at least one orbital plane and said one orbital plane of said pair of orbital planes having mutually opposite vectors comprises mutually adjacent crossing orbital planes at the equator.

12. A method of implementing continuous global or regional coverage of the earth by a non-uniform planar spaced constellation of satellites, comprising the steps of:
   providing at least one pair of orbital planes including a plurality of satellites so as to have inclined co-rotating orbits;
   providing at least one other orbital plane immediately adjacent one orbital plane of said at least one pair of orbital planes and including a plurality of satellites having an inclined counter-rotating orbit;
   the fields of view of the satellites in said at least one pair of orbital planes thereby forming an overlapped array of hexagonal packing at the earth's rotation, and the fields of view of the satellites in said one orbital plane and said one other orbital plane thereby forming an overlapped array of rectangular packing at the equator.

13. The method according to claim 12 and additionally including the steps of:
   spacing said at least one pair of co-rotating orbital planes so as to have a first angular spacing, and spacing said one co-rotating orbital plane and said at least one other counter-rotating orbital plane so as to have a second angular spacing.

14. The method according to claim 13 wherein said first angular spacing is greater than said second angular spacing.

15. A method of implementing continuous global or regional coverage of the earth by a non-uniform planar spaced constellation of satellites, comprising the steps of:

provide a plurality of inclined satellite orbital planes, each including at least one satellite, so as to have the same northernly or southernly vectors relative to the rotation of the earth;

providing at least one inclined orbital plane including at least one satellite located, between a pair of said plurality of orbital planes, so as to have an opposite northernly or southernly vector relative to the vectors of said satellites in said plurality of orbital planes;

the fields of view of the satellites in mutually adjacent planes of said plurality of orbital planes, thereby forming an overlapped array of hexagonal packing at the earth's equator, and the fields of view of the satellites in said at least one orbital plane and one mutually adjacent orbital plane of said pair of orbital planes thereby forming an overlapped array of rectangular packing at the equator.

16. The method according to claim 15 and additionally including the steps of:

mutually spacing said plurality of orbital planes having the same vectors so as to have a first angular spacing, and spacing said at least one orbital plane and said one orbital plane of said pair of orbital planes so as to have a second angular spacing.

17. The method according to claim 16 wherein said first angular spacing is greater than said second angular spacing.

18. The method according to claim 17 and additionally including the step of:

locating at least one other inclined orbital plane including at least one satellite having said same opposite vector between another pair of orbital planes of said plurality of orbital planes, and wherein the spacing of said one other inclined orbit and one orbital plane of said another pair of orbits is substantially equal to said second angular spacing.

19. The method according to claim 16 wherein said plurality of orbital planes having said same northernly or southernly vectors comprises mutually adjacent non-crossing orbital planes at the equator.

20. The method according to claim 16 wherein said plurality of orbital planes having said same northernly or southernly vectors comprise mutually adjacent crossing orbital planes at the equator.

21. The method according to claim 16 wherein said at least one orbital plane and said one orbital plane of said pair of orbital planes having mutually opposite vectors comprises mutually adjacent non-crossing orbital planes at the equator.

22. The method according to claim 16 wherein said at least one orbital plane and said one orbital plane of said pair of orbital planes having mutually opposite vectors comprises mutually adjacent crossing orbital planes at the equator.

23. A non-uniform planar spaced constellation of satellites for providing continuous global or regional coverage of the earth, comprising:

at least one pair of orbital planes including a plurality of satellites having inclined co-rotating orbits;

at least one other orbital plane immediately adjacent one orbital plane of said at least one pair of orbital planes and including a plurality of satellites having an inclined counter-rotating orbit;

wherein the fields of view of the satellites in said at least one pair of orbital planes form an overlapped array of hexagonal packing at the earth's equator and the fields of view of the satellites in said one orbital plane and said one other orbital plane form an overlapped array of rectangular packing at the equator;

wherein the spacing between said at least one pair of co-rotating orbital planes is greater than the spacing between said one co-rotating orbital plane and said at least one other counter-rotating orbital plane.

* * * * *